United States Patent
Park et al.

(10) Patent No.: US 10,530,722 B2
(45) Date of Patent: Jan. 7, 2020

(54) METHOD AND DEVICE FOR FORWARDING MESSAGE IN WIRELESS COMMUNICATION SYSTEM

(71) Applicant: LG ELECTRONICS INC., Seoul (KR)

(72) Inventors: Seungkyu Park, Seoul (KR); Seongyun Kim, Seoul (KR); Hongbeom Ahn, Seoul (KR); Seungmyeong Jeong, Seoul (KR); Heedong Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 57 days.

(21) Appl. No.: 15/322,935

(22) PCT Filed: Dec. 23, 2014

(86) PCT No.: PCT/KR2014/012717
§ 371 (c)(1),
(2) Date: Dec. 29, 2016

(87) PCT Pub. No.: WO2016/003034
PCT Pub. Date: Jan. 7, 2016

(65) Prior Publication Data
US 2017/0149712 A1 May 25, 2017

Related U.S. Application Data

(60) Provisional application No. 62/018,672, filed on Jun. 30, 2014.

(51) Int. Cl.
*H04L 12/58* (2006.01)
*H04W 60/00* (2009.01)
(Continued)

(52) U.S. Cl.
CPC ............ *H04L 51/14* (2013.01); *H04W 4/70* (2018.02); *H04W 60/00* (2013.01)

(58) Field of Classification Search
CPC ..... H04W 80/04; H04W 88/06; H04W 88/08; H04W 84/18; H04L 29/06
See application file for complete search history.

(56) References Cited

U.S. PATENT DOCUMENTS 7,319,880 B2 * 1/2008 Sin .................... H04W 4/16
455/412.2
8,588,690 B2 * 11/2013 Turtinen ............... H04W 8/005
455/41.2
(Continued)

FOREIGN PATENT DOCUMENTS

KR 10-2012-0043787 A 5/2012
KR 10-2013-0135009 A 12/2013
(Continued)

*Primary Examiner* — Gbemileke J Onamuti
*Assistant Examiner* — Sanjay K Dewan
(74) *Attorney, Agent, or Firm* — Birch, Stewart, Kolasch & Birch, LLP

(57) ABSTRACT

A method for forwarding a message in a wireless communication system according to an embodiment of the present invention is performed by an M2M device, and comprises the steps of: receiving a request message; checking whether the M2M device is a recipient of the request message, using a particular parameter included in the request message; when the M2M device is not a recipient of the request message, checking whether only one registrant M2M device exists other than the M2M device which has received the request message within one hop of the M2M device, wherein the registrant M2M device is in an M2M device in which one or more other M2M devices can be registered; and when the only one registrant M2M device is present within the one
(Continued)

hop, forwarding the request message to the only one registrant M2M device, wherein the particular parameter may be a "to" parameter.

8 Claims, 8 Drawing Sheets

(51) Int. Cl.
*H04W 4/00* (2018.01)
*H04W 4/70* (2018.01)

(56) References Cited

U.S. PATENT DOCUMENTS

| | | | | |
|---|---|---|---|---|
| 9,030,984 | B2* | 5/2015 | Yang | H04W 52/242 |
| | | | | 370/311 |
| 10,111,160 | B2* | 10/2018 | Patil | H04W 48/16 |
| 2005/0036457 | A1* | 2/2005 | Salin | H04L 51/14 |
| | | | | 370/328 |
| 2011/0103240 | A1* | 5/2011 | Taghavi Nasrabadi | |
| | | | | H04W 72/085 |
| | | | | 370/252 |
| 2012/0134287 | A1* | 5/2012 | Turunen | H04W 4/06 |
| | | | | 370/252 |
| 2012/0314660 | A1* | 12/2012 | Leppanen | G06Q 10/10 |
| | | | | 370/328 |
| 2013/0083779 | A1* | 4/2013 | Ahn | H04W 72/04 |
| | | | | 370/336 |
| 2013/0242866 | A1* | 9/2013 | Lin | H04B 7/26 |
| | | | | 370/328 |
| 2013/0294283 | A1* | 11/2013 | Van Phan | H04W 4/00 |
| | | | | 370/252 |
| 2013/0315079 | A1* | 11/2013 | Edge | H04W 4/02 |
| | | | | 370/252 |
| 2014/0269528 | A1* | 9/2014 | Zhu | H04W 24/02 |
| | | | | 370/329 |
| 2014/0307632 | A1* | 10/2014 | Kim | H04W 4/005 |
| | | | | 370/328 |
| 2015/0033312 | A1* | 1/2015 | Seed | H04W 4/70 |
| | | | | 726/7 |
| 2015/0109926 | A1* | 4/2015 | Jin | H04W 40/04 |
| | | | | 370/235 |
| 2016/0037385 | A1* | 2/2016 | Boudreau | H04W 76/14 |
| | | | | 370/328 |
| 2016/0135241 | A1* | 5/2016 | Gujral | H04W 4/70 |
| | | | | 370/328 |
| 2017/0013658 | A1* | 1/2017 | Ta | H04W 4/06 |
| 2017/0086125 | A1* | 3/2017 | Seo | H04W 76/14 |
| 2017/0149712 | A1* | 5/2017 | Park | H04W 40/04 |
| 2017/0150527 | A1* | 5/2017 | Duval | H04W 8/005 |
| 2018/0184427 | A1* | 6/2018 | Huang | H04W 8/005 |

FOREIGN PATENT DOCUMENTS

| | | |
|---|---|---|
| WO | WO 2013/002493 A2 | 1/2013 |
| WO | WO 2013/047976 A1 | 4/2013 |
| WO | WO 2013/073915 A1 | 5/2013 |

* cited by examiner

METHOD AND DEVICE FOR FORWARDING MESSAGE IN WIRELESS COMMUNICATION SYSTEM

CROSS REFERENCE TO RELATED APPLICATIONS

This application is the National Phase of PCT International Application No. PCT/KR2014/012717, filed on Dec. 23, 2014, which claims priority under 35 U.S.C. 119(e) to U.S. Provisional Application No. 62/018,672, filed on Jun. 30, 2014, all of which are hereby expressly incorporated by reference into the present application.

TECHNICAL FIELD

The present invention relates to a method of forwarding a message in a wireless communication system and an apparatus therefor.

BACKGROUND ART

As we are entering the age of ubiquitous, an M2M (machine to machine) communication technology is in the spotlight. Study on the M2M communication technology is in progress by many SDOs (standardization development organizations) including TIA, ATIS, ETSI, oneM2M and the like. In M2M environment, M2M devices or servers can be arranged by a hierarchical structure. Hence, although an M2M device or a server receives a message, the M2M device or the server may be not a recipient of the message.

Hence, the present invention proposes a method of more efficiently forwarding a message to a recipient.

DISCLOSURE OF THE INVENTION

Technical Task

An object of the present invention is to propose a management procedure for accessing a specific resource in a wireless communication system.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of forwarding a message by an M2M device in a wireless communication system, includes receiving a request message, checking whether or not the M2M device corresponds to a recipient of the request message using a specific parameter included in the request message, if the M2M device is not the recipient of the request message, checking whether or not there is only a registrar M2M device except an M2M device by which the request message is received within one hop of the M2M device, wherein the registrar M2M device corresponds to an M2M device to which one or more different M2M devices are able to register, and if there is only the registrar M2M device within the one hop, forwarding the request message to the registrar M2M device. In this case, the specific parameter may correspond to a 'to' parameter.

Additionally or alternately, if the M2M device is not the recipient of the request message, the method may further include checking whether or not the recipient of the request message corresponds to a specific M2M device to which the M2M device registered or which registered to the M2M device.

Additionally or alternately, if the recipient of the request message corresponds to the specific M2M device to which the M2M device registered which registered to the M2M device, the method may further include forwarding the request message to the specific M2M device.

Additionally or alternately, if there are a plurality of registrar M2M devices except the M2M device by which the request message is received within the one hop, the method may further include transmitting a message for querying information on a registrar M2M device to which the request message is forwarded to a device in which information for message forwarding is stored.

Additionally or alternately, the message for querying may include an identifier of the M2M device and an identifier of the recipient of the request message.

Additionally or alternately, the method may further include receiving a response message including an identifier of the registrar M2M device to which the request message is forwarded in response to the message for querying and forwarding the request message to the registrar M2M device to which the request message is forwarded.

To further achieve these and other advantages and in accordance with the purpose of the present invention, according to a different embodiment, an M2M device configured to forward a message in a wireless communication system includes an RF (radio frequency unit) and a processor configured to control the RF unit, the processor is further configured to receive a request message, check whether or not the M2M device corresponds to the recipient of the request message using a specific parameter included in the request message, if the M2M device is not the recipient of the request message, check whether or not there is only a registrar M2M device except an M2M device by which the request message is received within one hop of the M2M device, wherein the registrar M2M device corresponds to an M2M device to which one or more different M2M devices are able to register, and if there is only the registrar M2M device within the one hop, forward the request message to the registrar M2M device. In this case, the specific parameter may correspond to a 'to' parameter.

Additionally or alternately, if the M2M device is not the recipient of the request message, the processor may be further configured to check whether or not the recipient of the request message corresponds to a specific M2M device to which the M2M device registered or which registered to the M2M device.

Additionally or alternately, if the recipient of the request message corresponds to the specific M2M device to which the M2M device registered or which registered to the M2M device, the processor may be further configured to forward the request message to the specific M2M device.

Additionally or alternately, if there are a plurality of registrar M2M devices except the M2M device by which the request message is received within the one hop, the processor may be configured to transmit a message for querying information on a registrar M2M device to which the request message is forwarded to a device in which information for message forwarding is stored.

Additionally or alternately, the message for querying may include an identifier of the M2M device and an identifier of the recipient of the request message.

Additionally or alternately, the processor may be configured to receive a response message including an identifier of the registrar M2M device to which the request message is forwarded in response to the message for querying and forward the request message to the registrar M2M device to which the request message is forwarded.

The aforementioned solutions are just a part of embodiments of the present invention. Various embodiments to which technical characteristics of the present invention are reflected can be drawn and understood based on detail explanation on the present invention to be described in the following by those skilled in the corresponding technical field.

Advantageous Effects

According to one embodiment of the present invention, it is able to enhance efficiency for accessing a resource in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Reference will now be made in detail to the preferred embodiments of the present invention, examples of which are illustrated in the accompanying drawings. The following detailed description of the invention includes details to aid in full understanding of the present invention. Those skilled in the art will appreciate that the present invention can be implemented without these details.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present disclosure, devices for device-to-device communication, that is, M2M devices, may be fixed or mobile and include devices which communicate with a server for device-to-device communication, that is, an M2M server to transmit/receive user data and/or various types of control information. The M2M devices may be referred to as terminal equipment, mobile stations (MSs), mobile terminals (MTs), user terminals (UTs), subscriber stations (SSs), wireless devices, personal digital assistants (PDA), wireless modems, handheld devices and the like. In the present invention, the M2M server refers to a fixed station which communicates with M2M devices and/or other M2M servers, and exchanges various types of data and control information with M2M devices and/or other M2M servers by communicating with the M2M devices and/or other M2M servers.

A description will be given of technology associated with the present invention.

M2M Applications

These are applications that execute service logic and use a common service entity (CSE) accessible through an open interface. The M2M applications can be installed in an M2M device, an M2M gateway or an M2M server.

M2M Service

This is a set of functions that can be used by the M2M CSE through standardized interfaces.

oneM2M defines a common M2M service framework (or service platform, CSE or the like) for various M2M applications (or application entities (AEs)). M2M applications can be considered as software implementing service logic such as e-Health, City Automation, Connected Consumer and Automotive. The oneM2M service framework includes functions commonly necessary to implement various M2M applications. Accordingly, it is possible to easily implement various M2M applications using the oneM2M service framework without configuring frameworks necessary for the respective M2M applications. This can integrate M2M markets currently divided into many M2M verticals, such as smart building, smart grid, e-Heath, transportation and security, and thus remarkable growth of the M2M markets is expected.

Figure 1:
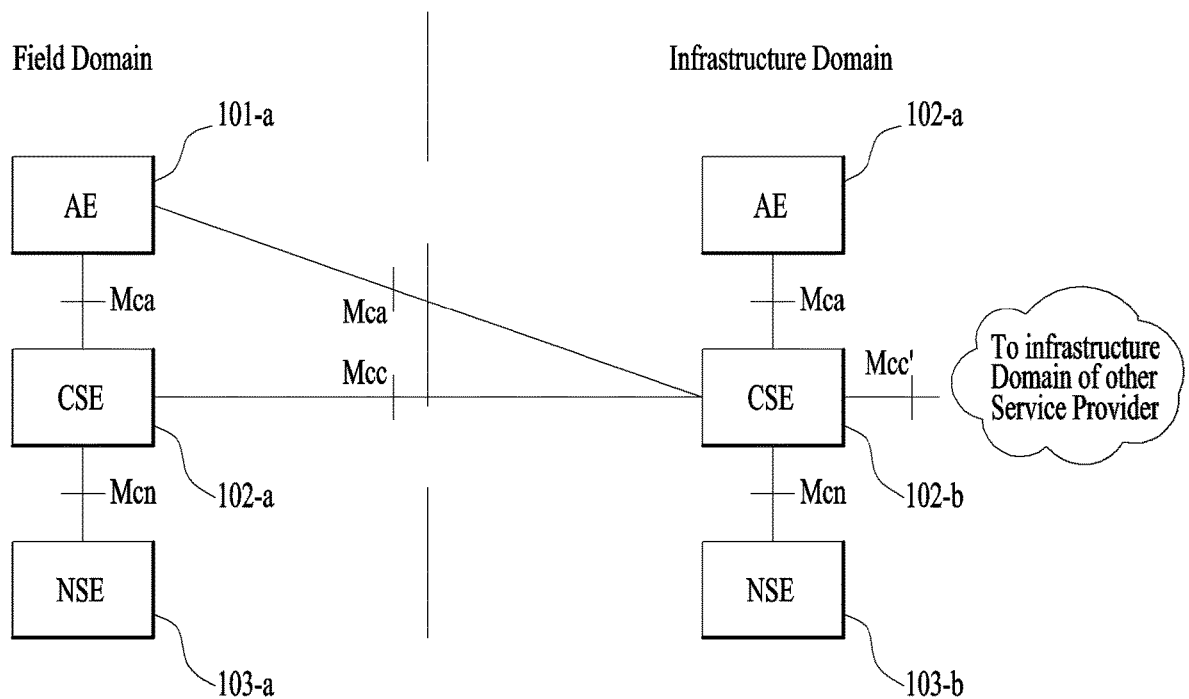
FIG. 1 is a diagram for a functional structure of an M2M communication system.

FIG. 1 illustrates the architecture of an M2M communication system. Each entity will now be described.

Application entity (AE, 101): Application entity provides application logic for end-to-end M2M solutions. Examples of the application entity include fleet tracking application, remote blood sugar monitoring application, remote power metering and controlling application.

Common service entity (CSE, 102): CSE comprises the set of "service functions" that are common to M2M environments and specified by oneM2M. Such service functions are exposed to AEs and other CSEs through reference points X and Y and used by the AEs and other CSEs. The reference point Z is used for accessing underlying network service entities.

Examples of the service functions provided by the CSE include data management, device management, M2M subscription management and location service. These functions can be logically classified into common service functions (CSFs). Some CSFs in the CSE are mandatory and some may be optional. Further, some functions in the CSFs are mandatory and some functions may be optional (e.g. some of application software installation, firmware update, logging and monitoring functions in "device management" CSF are mandatory functions and some are optional functions.)

Underlying network service entity (NSE, 103): provides services to the CSEs. Examples of such services include device management, location services and device triggering. No particular organization of the NSEs is assumed. Note: underlying networks provide data transport services between entities in the oneM2M system. Such data transport services are not included in the NSE.

The reference points shown in FIG. 1 will now be described.

Mca Reference Point

This is the reference point between an AE and a CSE. The Mca reference point allows the CSE to communicate with the AE such that the AE can use the services provided by the CSE.

The services provided through the Mca reference point are dependent on the functionality supported by the CSE. The AE and the CSE may or may not be co-located within the same physical entity.

Mcc Reference Point

This is the reference point between two CSEs. The Mcc reference point allows a CSE to use the services of another CSE in order to fulfill needed functionality. Accordingly, the Mcc reference point between two CSEs is supported over different M2M physical entities. The services offered via the Mcc reference point are dependent on the functionality supported by the CSEs.

Mcn Reference Point

This is the reference point between a CSE and an NSE. The Mcn reference point allows a CSE to use the services (other than transport and connectivity services) provided by the NSE in order to fulfill the needed functionality. It means services other than simple service such as transport and connectivity, for example, services such as device triggering, small data transmission and positioning.

Mcc' Reference Point

This is the reference point is used for communication between CSEs respectively belongs to different M2M service providers. Mcc' references point is similar to Mcc reference point in respect of connecting CSEs each other, but Mcc' reference point expands Mcc reference point to different M2M service providers while Mcc reference point is limited to communication in a single M2M service provider.

Figure 2:
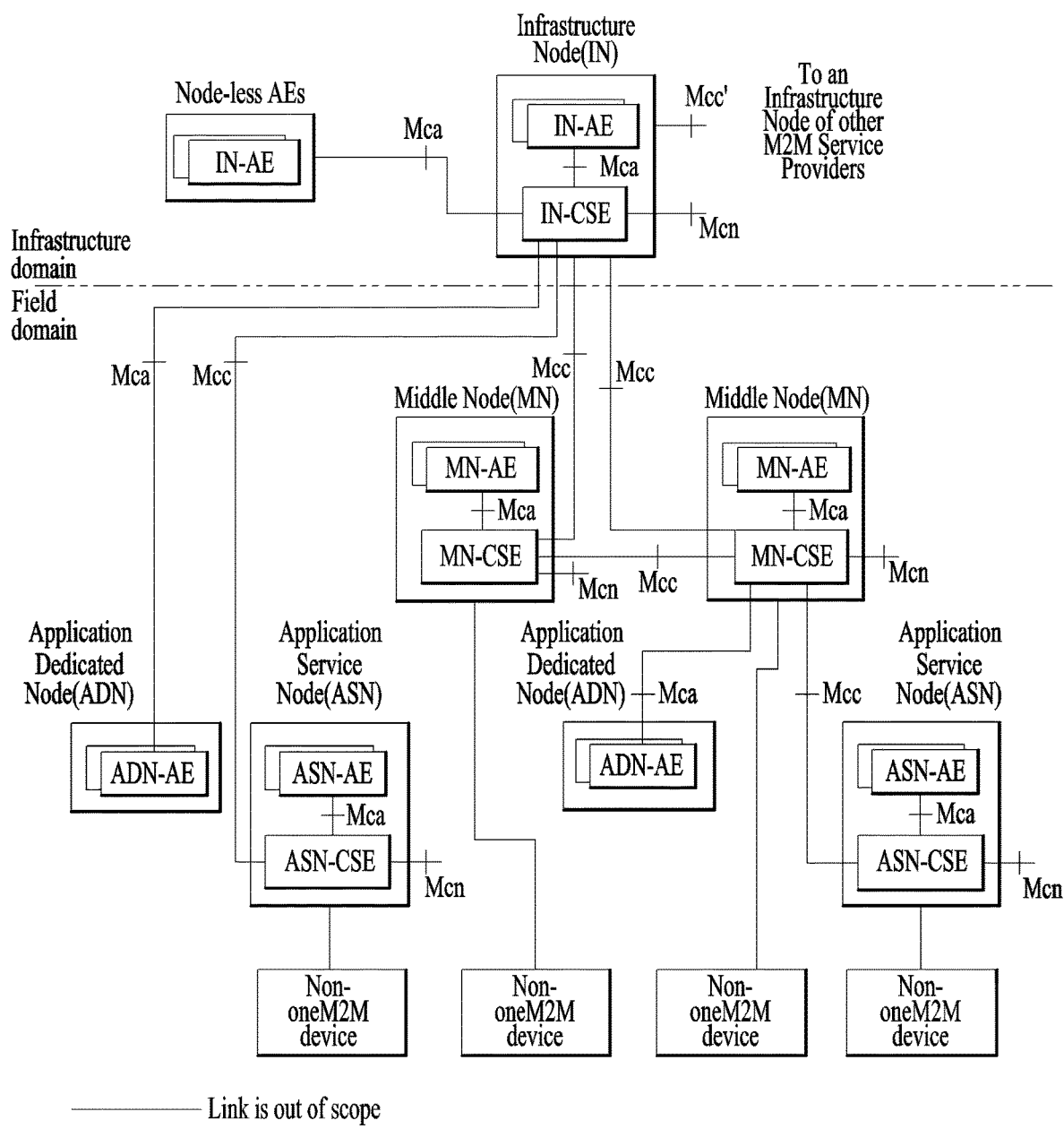
FIG. 2 is a diagram for a configuration supported by an M2M communication system based on an M2M functional structure.

FIG. 2 illustrates compositions supported by M2M communication system based on the architecture. The M2M communication system may support more various compositions without being limited to the illustrated compositions. A concept, which is called to node, important for understand the illustrated compositions will be explained.

Application Dedicated Node (ADN): An application dedicated node is a node that contains at least one M2M application and does not contain a CSE. The ADN can communicate over an Mca reference point with one middle node or one infrastructure node. The ADN can be present in an M2M device.

Application Service Node (ASN): An application service node is a node that contains at least one CSE and has at least one M2M application. The ASN can communicate over a Mcc reference point with one middle node or one infrastructure node. The ASN may be referred to as an M2M device.

Middle Node (MN): A middle node is a node that contains at least one CSE and may contain M2M applications. The middle node communicates over a Mcc references point with at least two nodes belonging to the following different category:
one or more ASNs;
one or more middle nodes (MNs); and
one infrastructure structure.

The MN can be connected with the ADN through an Mca reference point. The MN may be referred to as an M2M gateway.

Infrastructure Node (IN): An infrastructure node is a node that contains one CSE and may contain application entities (AEs). The IN may be referred to as an M2M server.

The IN communicates over a Mcc reference point with either:
one or more middle nodes; and/or
one or more application service nodes.

The IN may communicate with one or more ADNs over one or more Mca reference points.

Figure 3:
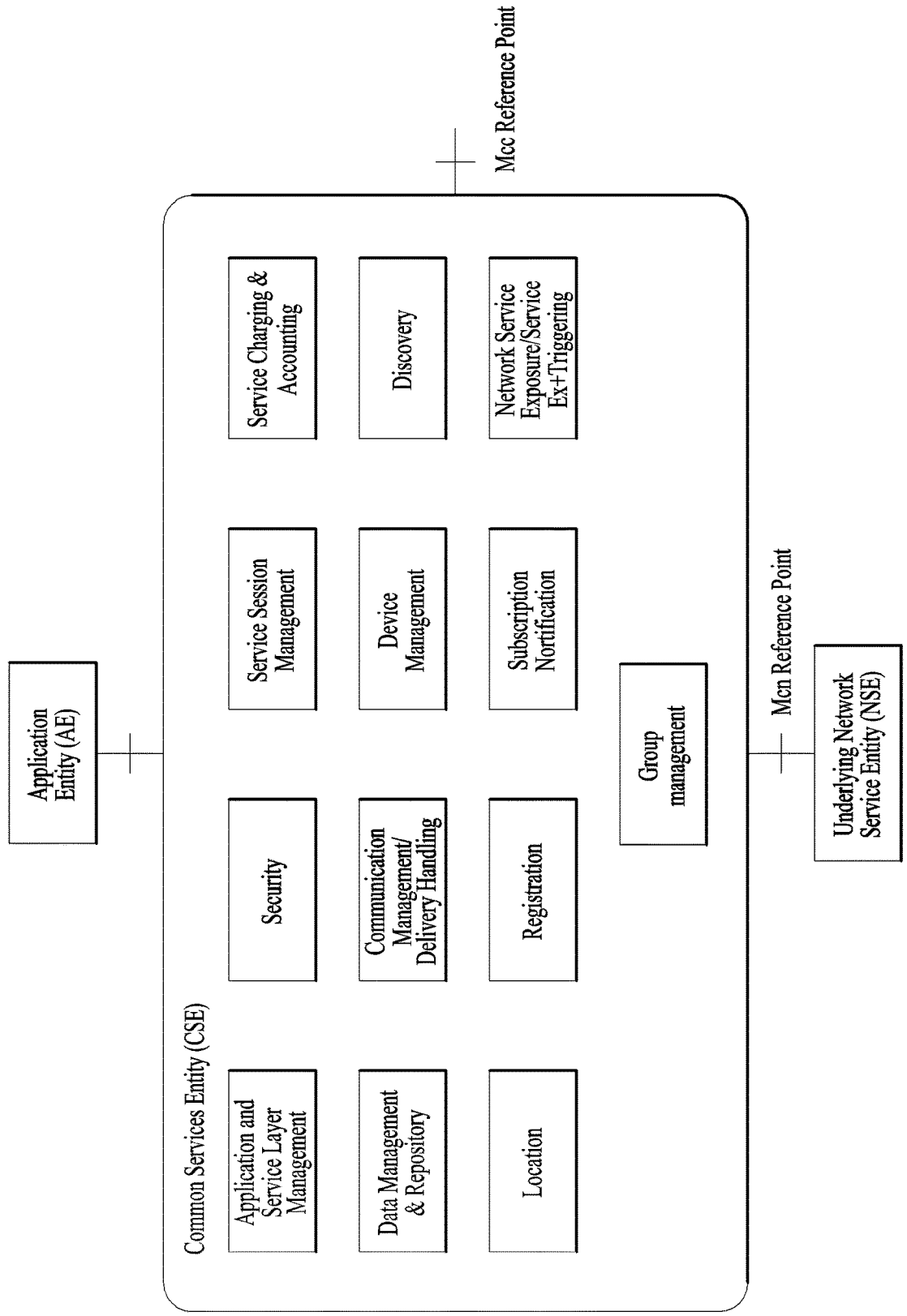
FIG. 3 is a diagram for a common service function provided by an M2M communication system.

FIG. 3 illustrates M2M service functions in the M2M communication system.

M2M service functions (i.e. common service functions) provided by the oneM2M service framework include "Communication Management and Delivery Handling", "Data Management and Repository", "Device Management", "Discovery", "Group Management", "Addressing and Identification", "Location", "Network Service Exposure, Service Execution and Triggering", "Registration", "Security", "Service Charging and Accounting", "Session Management" and "Subscription and Notification.", as shown in FIG. 3.

A brief description will be given of each M2M service function.

Communication Management and Delivery Handling (CMDH): this provides communications with other CSEs, AEs and NSEs and delivers messages.

Data Management and Repository (DMR): this enables M2M applications to exchange and share data.

Device Management (DMG): this manages M2M devices/gateways. Specifically, the device management function includes installation and setting of applications, determination of set values, firmware update, logging, monitoring, diagnostics, topology management, etc.

Discovery (DIS): this discovers resources and information based on conditions.

Group Management (GMG): this processes a request related to a group that may be generated by grouping resources, M2M devices or gateways.

Addressing and Identification (AID): this identifies and addresses physical or logical resources.

Location (LOC): this enables M2M applications to obtain position information of an M2M device or gateway.

Network Service Exposure, Service Execution and Triggering (NSE): this enables communication of an underlying network and use of functions provided by the underlying network.

Registration (REG): this handles registration of an M2M application or another CSE with a specific CSE. Registration is performed in order to use M2M service functions of the specific CSE.

Security (SEC): this performs handling of sensitive data such as a security key, association establishment, authentication, authorization, identity protection, etc.

Service Charging and Accounting (SCA): this provides a charging function to CSEs.

Session Management (SM): this manages an M2M session for end-to-end communication.

Subscription and Notification (SUB): this notifies change of a specific resource when the change of the specific resource is subscribed.

The M2M service functions are provided through CSE, and AE (or, M2M applications) may use through Mca reference point, or other CSE may use the M2M service functions through Mcc reference point. Also, the M2M service functions may be operated synchronized with underlying network (or underlying network service entity (NSE) such as 3GPP, 3GPP2, Wi-Fi, Bluetooth).

All oneM2M devices/gateways/infrastructures do not have higher functions and may have mandatory functions and some optional functions from among the corresponding functions.

Figure 4:
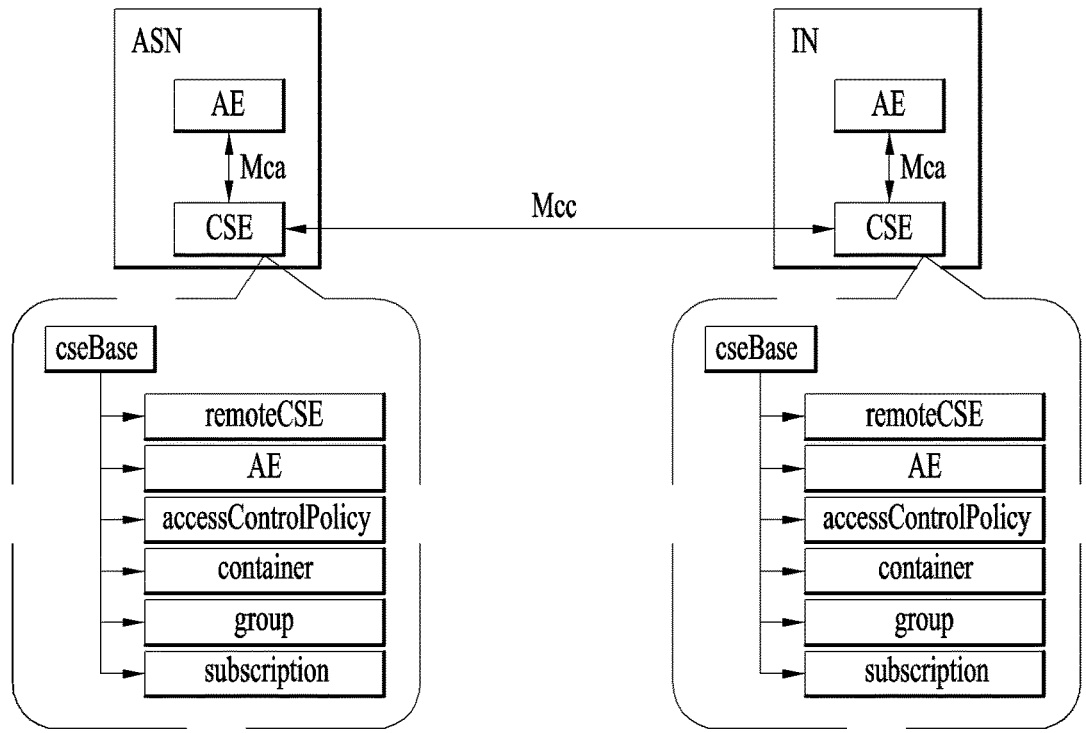
FIG. 4 is a diagram for a resource structure existing in an M2M application service node and an M2M infrastructure node.

FIG. 4 illustrates structures of resources present in an M2M application service node and an M2M infrastructure node.

The M2M architecture defines various resources. M2M services for registering applications and reading sensor values can be performed by operating the resources. The resources are configured in one tree structure and may be logically connected to the CSE or stored in the CSE to be stored in M2M devices, M2M gateways, network domains and the like. Accordingly, the CSE can be referred to as an entity that manages resources. The resources have a <cseBase> as a tree root. Representative resources are described below.

<cseBase> resource: this is a root resource of oneM2M resources configured in a tree and includes all other resources.

<remoteCSE> resource: this belongs to <cseBase> resource and includes information on other CSE being connected or registered to corresponding CSE.

<AE> resource: this is a resource that is lower than <cseBase> or <remoteCSE> resource, and stores information on applications registered (connected) with the corresponding CSE when present under <cseBase> resource, and stores information on applications registered with other CSEs (in the name of CSE) when present under <remoteCSE> resource.

<accessControlPolicy> resource: this stores information associated with access rights to specific resources. Authentication is performed using access rights information included in this resource.

<container> resource: this is a resource that is lower than containers and stores data per CSE or AE.

<group> resource: this is a resource that is lower than groups and provides a function of grouping a plurality of resources and simultaneously processing the grouped resources.

<subscription> resource: this is a resource that is lower than subscriptions and executes a function of announcing a state change such as a resource value change through notification.

Figure 5:
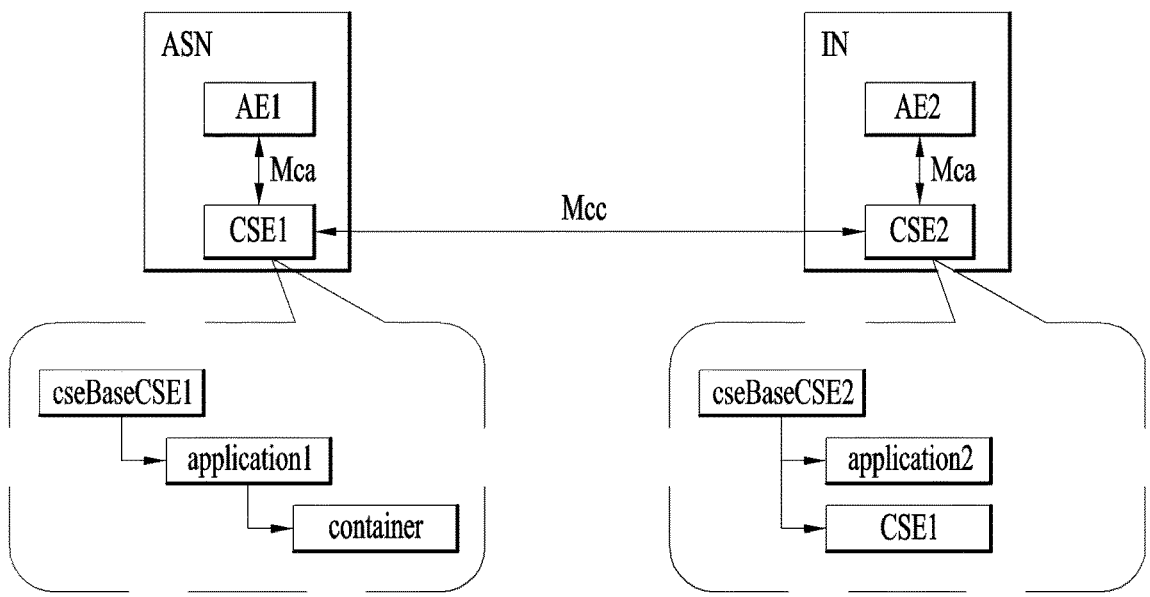
FIG. 5 is a diagram for a resource structure existing in an M2M application service node (e.g., M2M device) and an M2M infrastructure node.

FIG. 5 illustrates structures of resources present in an M2M application service node (e.g. M2M device) and an M2M infrastructure node.

A description will be given of a method by which an AE (application 2) registered with the M2M infrastructure node reads a value of a sensor of the M2M device. The sensor refers to a physical device, in general. An AE (application 1) present in the M2M device reads a value from the sensor and stores the read value in the form of a container resource in a CSE (CSE 1) in which the AE (application 1) has registered. To this end, the AE present in the M2M device needs to be pre-registered with the CSE present in the M2M device. Upon completion of registration, registered M2M application related information is stored in the form of cseBaseCSE1/application1 resource, as shown in FIG. 5.

When the sensor value is stored, by the AE present in the M2M device, in a container resource lower than the cseBaseCSE1/application1 resource, the AE registered with the infrastructure node can access the corresponding value. To enable access, the AE registered with the infrastructure node also needs to be registered with a CSE (CSE 2) of the infrastructure node. Registration of the AE is performed by storing information about application 2 in cseBaseCSE2/application2 resource as application 1 is registered with CSE 1. Application 1 communicates with application 2 via CSE 1 and CSE 2 instead of directly communicating with application 2. To this end, CSE 1 needs to be pre-registered with CSE 2. When CSE 1 registers with CSE 2, CSE 1 related information (e.g. Link) is stored in the form of <remoteCSE> resource lower than cseBaseCSE2 resource. That is, <remoteCSE> provides a CSE type, access address (IP address and the like), CSE ID, and reachability information about the registered CSE.

Resource discovery refers to a process of discovering resources present in a remote CSE. Resource discovery is performed through a retrieve request and the retrieve request for resource discovery includes the following.

<startURI>: this indicates a URI. The URI can be used to limit the range of resources to be discovered. If <startURI> indicates a resource root <cseBase>, resource discovery is performed on all resources of a receiver that has received the retrieve request. The receiver performs resource discovery only on a resource indicated by <startURI> and a lower resource thereof.

filterCriteria: this information describes information related to a resource to be discovered. The receiver searches the resources within a discovery range defined by <startURI> for a resource that satisfies filterCriteria and transmits the resource to a requester of the corresponding request.

Address System of M2M Wireless Communication System

In a M2M wireless communication system in which the present invention is implemented, a request message or a response message can indicate a target CSE at which the message finally arrives and a CSE, which has firstly transmitted the message, using "to" and "from" parameters. "To" and "from" parameters are described in the following.

to: URI of a target resource of a corresponding operation (command)

from: identifier representing the originator

The "to" parameter can be represented by one of schemes described in the following.

A resource exists in a CSE and may be then able to access a different entity via Mca, Mcc, Mcc', and Mcc'. To this end, all resources are addressed by a unique URI and a request message includes the URI to specify a resource on which a command to be performed. The URI can be represented by a scheme based on a parent-child relation between resources. In this case, a name of a resource can be listed in a manner of being distinguished by '/' based on the parent-child relation. In this case, the name of the resource is unique among children of a specific parent only.

Example 1: "IN-CSEID.m2m.myoperator.org/CSERoot/myAppX/myContainerY."

A resource can be addressed by URI not explicitly including a parent-child relation. In this case, a unique name is provided to all resources in a specific CSE and it is not necessary to address a resource in consideration of a parent-child relation between actual resources. It is necessary for a hosting CSE (a CSE including original of a corresponding resource) to resolve a logical position of a target resource in a relation chain of a resource structure.

Example 2: "IN-CSEID.m2 m.myoperator.org/CSERoot/myContainerY"A storing position (container) identical to that of a previous example is directly addressed.

Routing Scheme of IP (Internet Protocol) and Application to M2M

The Internet protocol routes a packet based on an IP address. To this end, all IP nodes manage a routing table. The IP routing table has entities described in the following.

Network ID: A network ID for a router. The network ID may correspond to IP addresses for a class-based, a subnet, a supernet, and a host path.

Subnet mask: A subnet mask is used for checking a destination IP address and a network ID.

Next hop: IP address for a next hop.

Interface: designates a network interface to be used for forwarding an IP packet.

Metric: Cost for selecting a best path among paths for arriving at identical destination. In general, metric is used for designating the number of hops to a network ID. A router of a lowest metric corresponds to a best path.

An example of a Window NT routing table is shown in the following.

TABLE 1

| Network address | Net mask | GW address | Interface | Metric | purpose |
| --- | --- | --- | --- | --- | --- |
| 0.0.0.0 | 0.0.0.0 | 157.55.16.1 | 157.55.27.90 | 1 | Basic path |
| 127.0.0.0 | 255.0.0.0 | 127.0.0.1 | 127.0.0.1 | 1 | Roof back network |
| 157.55.16.0 | 255.255.240.0 | 157.55.27.90 | 155.55.27.90 | 1 | Directly connected network |
| 157.55.27.90 | 255.255.255.255 | 127.0.0.1 | 127.0.0.1 | 1 | Regional host |
| 157.55.255.255 | 255.255.255.255 | 157.55.27.90 | 157.55.27.90 | 1 | Network broadcast |
| 224.0.0.0 | 224.0.0.0 | 157.55.27.90 | 157.55.27.90 | 1 | Multicast address |
| 255.255.255.255 | 255.255.255.255 | 157.55.27.90 | 157.55.27.90 | 1 | Restricted broadcast |

An IP packet is forwarded according to a following procedure using the above routing table and a destination IP address of a received IP packet.

Bit AND calculation between a destination IP address and a subnet mask is performed on each entry of the routing table. A result of the calculation is compared with the network ID in the entry.

A list of comparison paths is collected. A router including a most matched path (a path of which most of bits are matched with a destination IP address) is selected. The most matched path can be regarded as a perfect path for a destination IP address. If a plurality of entries are found out, a router selects an entry of a smallest metric from among a plurality of the entries to select a best path. If entries have the same metric as well, the router can freely select a path from among the entries.

An IP address basically forms a group in a manner of being bound by a subnet. In particular, when a wireless AP is installed in home, IP nodes connected with the AP basically belong to 192.167.0.0 subnet and have an address form such as 192.167.x.y. Since a routing table is configured according to a subnet rather than an IP node, it is able to efficiently configure the routing table.

It may apply the aforementioned IP routing method to an M2M wireless communication system. Yet, since it is unable to configure an address system of the M2M wireless communication system as a group of the aforementioned subnet form, it is necessary to generate a routing table for every CSE. Since a routing table is required for every single device in M2M environment, it becomes very inefficient. Moreover, if an M2M device has mobility, although a message has an identical destination address (to parameter), the message should be differently forwarded depending on current connection information of the device.

Figure 6:
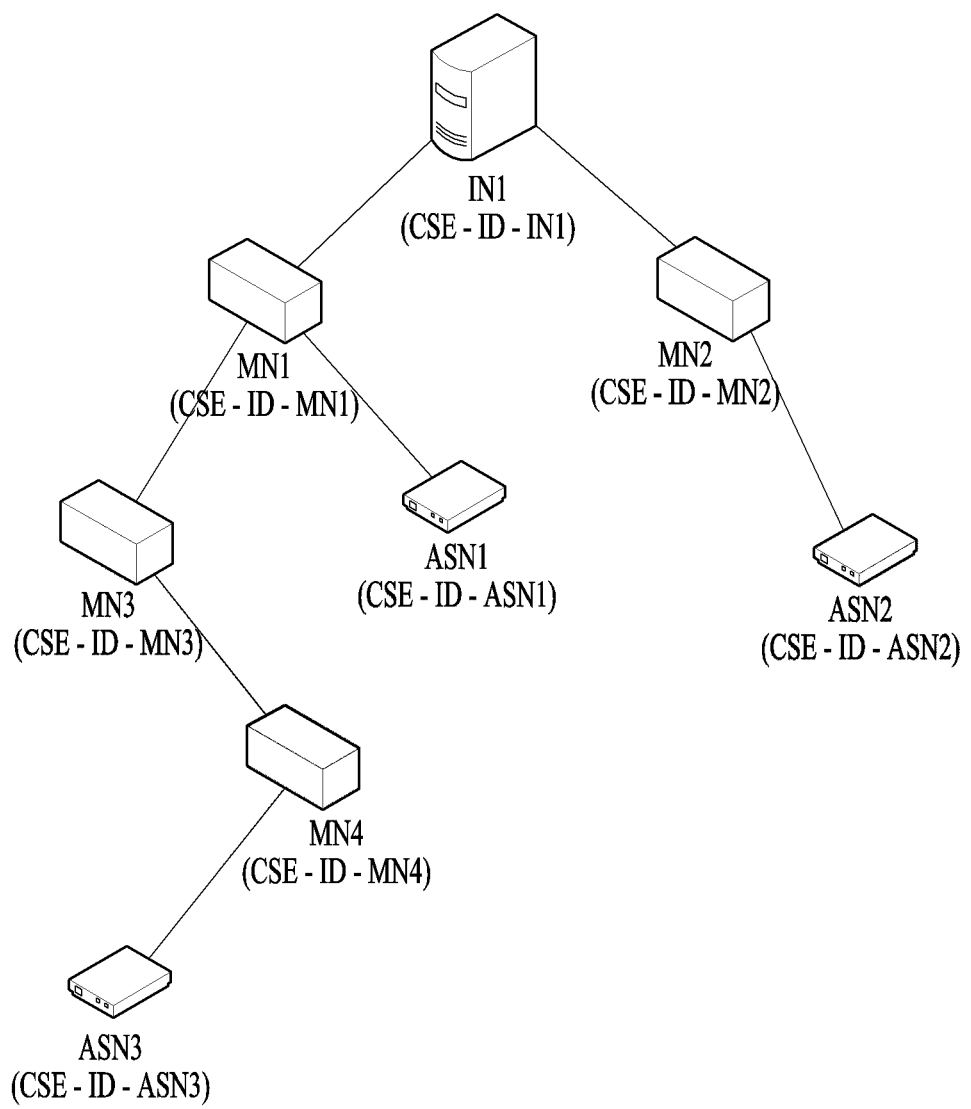
FIG. 6 is a diagram for a structure of an M2M wireless communication system according to one embodiment of the present invention.

FIG. 6 is a diagram for a structure of an M2M wireless communication system according to one embodiment of the present invention. As shown in FIG. 6, the M2M wireless communication system can be configured to have an MN (middle node). In the present invention, assume that a configuration of a tree structure is supported only. In particular, one node can be registered at one node only at the same time. Hence, it may have one node only corresponding to parent. However, since it is able to register a plurality of nodes at the node corresponding to the parent, it may have a plurality of nodes corresponding to children.

Registration/De-Registration Report

In the present invention, a method of configuring information for forwarding a message in a separate node of a central server form instead of configuring the information in each MN is described. The node in which the information for forwarding the message is stored is referred to as an RFN (routing function mode) or simply a device configured to store information for forwarding a message. An MN reports the information to a different MN newly registered at the MN or an ASN. The procedure is shown in FIG. 7.

Figure 7:
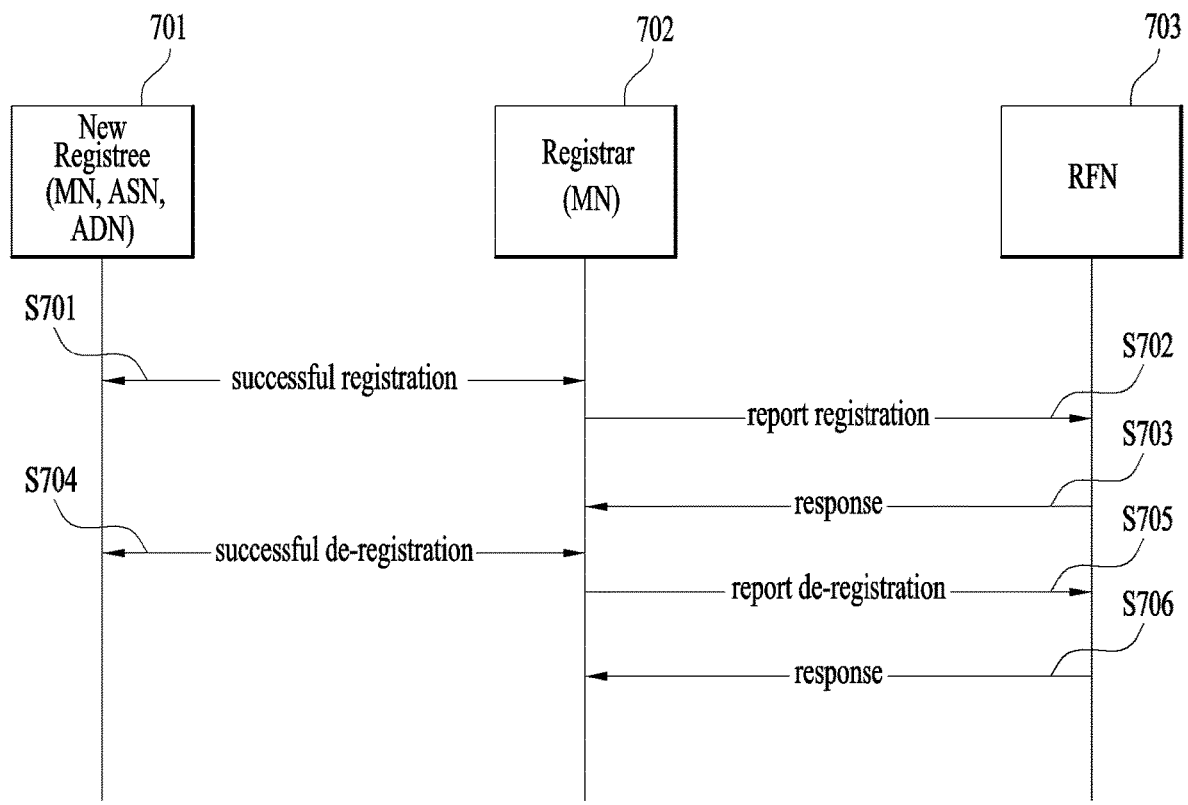
FIG. 7 is a flowchart for a procedure of registering at RFN or a procedure of reporting de-registration according to one embodiment of the present invention.

FIG. 7 is a flowchart for a procedure of registering at RFN or a procedure of reporting de-registration according to one embodiment of the present invention.

Each step is explained in detail in the following.

S701: A new node 701 and an MN 702 perform registration. When the registration is successfully performed, if the registered node 701 corresponds to an MN or an ASN, a <remoteCSE> resource is generated in the MN 702. In case of an AND, an <AE> resource is generated. The resource stores information on an MN, an ASN, and an ADN that registration is completed.

S702: If registration is successfully performed, the MN 702 performs registration reporting to an RFN (routing function node) 703. Information included in the registration reporting is described in the following.

Registrar ID: ID of an MN, which have received a registration request (CSE-ID)

Registree ID: IDs of newly registered MN, ASN, and ADN (CSE-ID or AE-ID)

Having received a registration request, the RFN 703 should store a pair of a Registrar ID and a Registree ID (Registrar ID, Registree ID) corresponding to registration information. If there exists a previous Registree ID, it is necessary to delete the registration information. This is because, since a node is able to register at a single node, previous registration information is not valid. The RFN 703 informs a previous Registrar that a Registree ID is newly registered at a different node and makes the previous Registrar autonomously perform de-registration (deletion of <remoteCSE> or <AE> resource).

S703: The RFN 703 can transmit a response in response to the registration reporting.

S704: A previously registered node performs de-registration together with the MN 702. If the de-registration is completed, the <remoteCSE> and the <AE> resources generated in the MN 702 are deleted.

S705: The MN 702 can transmit a de-registration report to the RFN 703. In this step, when a registered node explicitly transmits a de-registration request to the RFN or the MN 702 autonomously deletes the <remoteCSE> or the <AE> resource due to expiration time, the de-registration report can be transmitted. Yet, as mentioned earlier in the step S702, if the RFN 703 informs the MN 702 of information indicating that a node registered at the MN 702 newly registers at a different node and the MN 702 performs de-registration, the de-registration reporting should not be performed to the RFN 703. Information included in the de-registration reporting is described in the following.

Registrar ID: ID of an MN, which have received a de-registration (CSE-ID)

De-Registered CSE ID: IDs of de-registered MN, ASN, and ADN (CSE-ID or AE-ID)

S706: The RFN 703 can transmit a response to the MN 702 in response to the de-registration reporting.

In the foregoing description, any interface can be used between the MN 702 and the RFN 703. In this case, Mcc interface can also be used between the MN 702 and the RFN 703. In this case, as shown in FIG. 8, a separate resource can be configured to store registration-related information.

Figure 8:
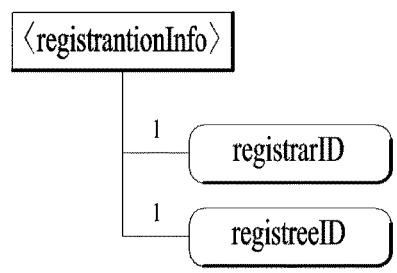
FIG. 8 is a diagram for <registrationInfo> resource according to one embodiment of the present invention.

Referring to FIG. 8, <registrarID> and <registreeID> attributes exist in a <registrationInfo> resource.

The <registrarID> and <registreeID> resources are explained in detail in the following.

registered nodes on a system. In environment of a hierarchical MN, an M2M message is forwarded to a next hop using the information.

Figure 9:
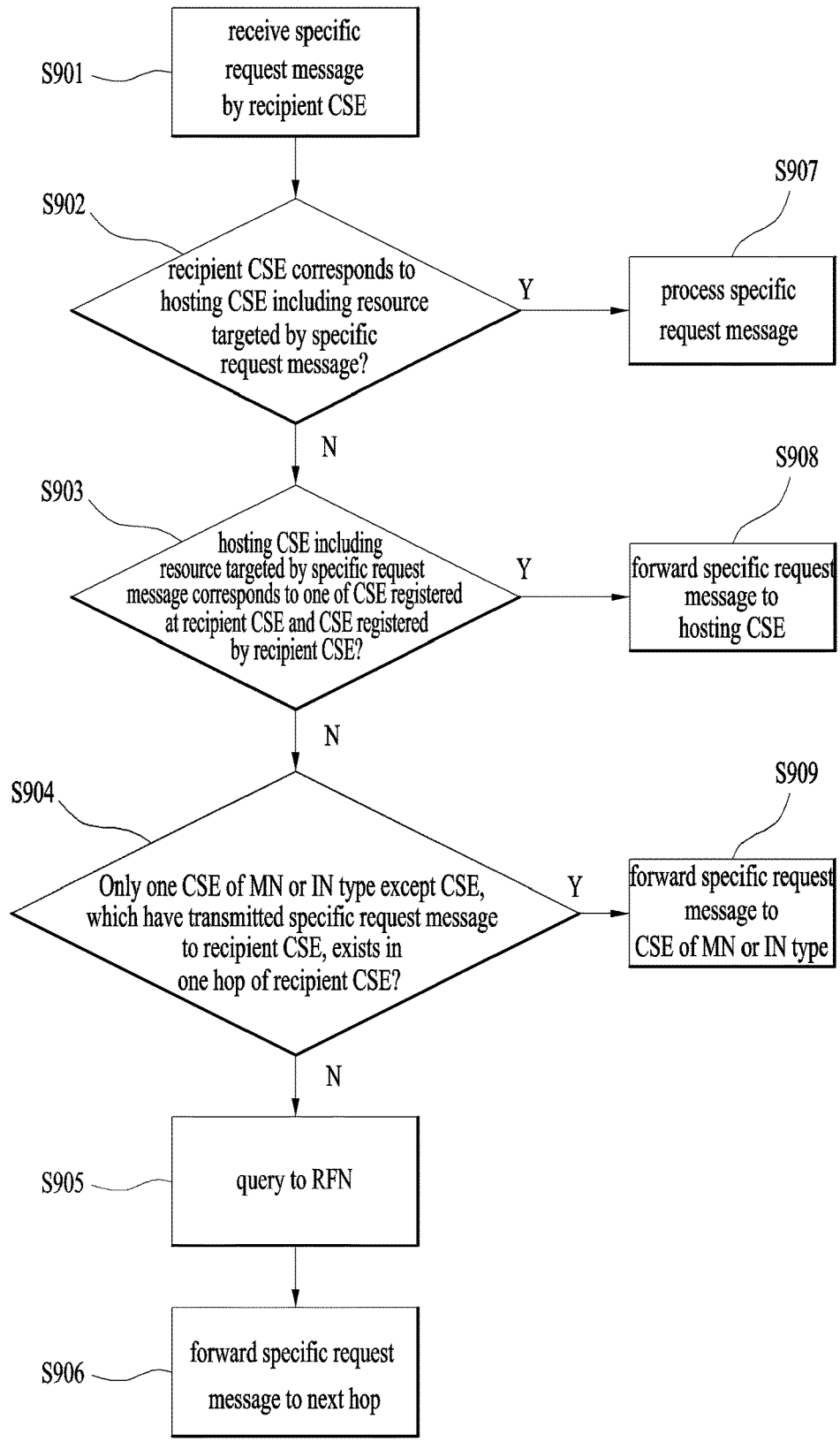
FIG. 9 is a flowchart for a method of forwarding a message according to one embodiment of the present invention.

FIG. 9 is a flowchart for a method of forwarding a message according to one embodiment of the present invention.

S901: A CSE can receive a specific request message. The specific request message includes "to" parameter. For clarity, the CSE, which have received the specific request message, is referred to as a recipient CSE in the present step. For clarity, a CSE, which have transmitted the specific request message to the recipient CSE, is referred to as a transmitter CSE in embodiment related to FIG. 9.

S902: The recipient CSE checks whether or not the recipient CSE corresponds to a hosting CSE via the "to" parameter. In particular, the recipient CSE can check whether or not the recipient CSE has a resource targeted by the specific request message. The present step can be performed by comparing CSE-ID included in the "to" parameter of the specific request message and CSE-ID of the recipient CSE with each other. If the recipient CSE corresponds to the hosting CSE, it may proceed to the step S907. Otherwise, it may proceed to the step S903.

S903: This step is performed when the recipient CSE is not the hosting CSE. The recipient CSE checks whether or not there is a CSE targeted by the specific request message among Registree CSE registered at the recipient CSE and Registrar CSE registered by the recipient CSE. If a CSE targeted by the specific request message corresponds to the Registree CSE of the recipient CSE or the registrar CSE, it may proceed to the step S908. Otherwise, it may proceed to the step S904.

S904: This step is performed when there is no CSE targeted by the specific request message among the Registree CSE registered at the recipient CSE and the Registrar

TABLE 1

| Attribute name of <accessControlPolicy> | Multiplicity | RW/RO/WO | Description |
|---|---|---|---|
| registrarID | 1 | WO | registrarID is ID of CSE, which have received registration request and generated <remoteCSE> or <AE> resource. registrarID corresponds to MN (middle node) |
| registreeID | 1 | WO | ASN or ADN, which has transmitted registration request to registrar CSE. CSE-ID or AW-ID is included in registreeID. |

As mentioned in the foregoing description, if a <registrationInfo> resource is used, Mcc reference point is used between the MN 702 and the RFN 703 in FIG. 7. The steps S702 and S705 can be modified as follows.

S702: The MN 702 can perform registration reporting to the RFN 703 by generating the <registrationInfo> resource. A registrarID attribute of the <registrationInfo> resource includes CSE-ID of Registrar and a registreeID attribute includes CSE-ID or AE-ID of Registree.

S705: The MN 702 performs de-registration reporting to the RFN 703 by deleting the <registrationInfo> resource generated in the step S702. A registrarID attribute of the <registrationInfo> resource to be deleted includes CSE-ID and a registreeID attribute includes CSE-ID or AE-ID of Registree.

Message Forwarding in Hierarchical MN

After the aforementioned registration/de-registration reporting is performed, the RFN has information on all CSE registered by the recipient CSE. If there is a single CSE of MN or IN-type only among the remaining CSEs except the "transmitter CSE" among a CSE (Registrar CSE) registered by the recipient CSE and all CSEs (Registree CSEs) registered at the recipient CSE, it may be able to forward the specific request message to the CSE [S909]. In particular, if there is a single CSE of the MN or IN type within a hop of the recipient CSE except the "transmitter CSE", the specific request message can be transmitted to the single CSE. This is because, since a CSE of a different type rather than the MN or IN type is unable to have a different CSE registered at the CSE, there is no CSE targeted by the specific request message. ASN, MN or IN type of a CSE can be checked based on a cseType attribute of a <cseBase> resource of the Registrar CSE or the Registree CSE.

S905: This step is performed when there are a plurality of CSEs of MN or IN type among the remaining CSEs except the "transmitter CSE" within a hop of the recipient CSE. The recipient CSE should select a CSE to forward the specific request message from among a plurality of the CSEs. To this end, the recipient CSE makes a request for a next hop for forwarding the specific request message to the RFN. The request include information described in the following.

CSE-ID of the recipient CSE

CSE-ID of CSE targeted by the specific request message

Having received the request for the next hop, the RFN determines the next hop of the specific request message and transmits CSE-ID of the next hop to the recipient CSE in response to the request of the recipient CSE. The RFN uses the information collected from the procedure mentioned earlier with reference to the registration/de-registration reporting to determine the next hop.

S906: The recipient CSE can forward the specific request message using the next hop received from the RFN in the step S905.

S907: This step is performed when the recipient CSE corresponds to the hosting CSE. In the present step, the specific request message can be processed.

S908: This step is performed when there is a CSE targeted by the specific request message among the Registrar CSE of the recipient CSE and the Registree CSE mentioned earlier in the step S903. In this case, the recipient CSE can forward the specific request message to a corresponding CSE without inquiring a next hop to the RFN.

S909: This step is performed when there is no CSE targeted by the specific request message among the Registrar CSE of the recipient CSE and the Registree CSE but there is a single CSE of MN or IN type among the remaining CSEs except "transmitter CSE" among CSEs within a hop of the recipient CSE. In this case, the recipient CSE can forward the specific request message to the CSE.

Figure 10:
FIG. 10 is a diagram of a resource for indicating a next hop for forwarding a message according to one embodiment of the present invention.

In the step S905, it may make a request for a next hop to the RFN in various ways. Yet, the request should have "CSE-ID of the recipient CSE" and "CSE-ID of a CSE targeted by the specific request message". Or, it may use Mcc reference point for the request. To this end, it may consider a <nextHop> virtual resource shown in FIG. 10.

Since the <nextHop> virtual resource corresponds to a virtual resource, the <nextHop> virtual resource has no attribute. In the step S905, the recipient CSE sends a RETRIEVE command to the <nextHop> resource and can additionally forward "CSE-ID of a CSE targeted by the specific request message" to the <nextHop> resource in a query form.

Meanwhile, since the recipient CSE, the Registrar CSE, and the Registree CSE mentioned earlier with reference to FIG. 9 correspond to entities capable of existing at an M2M device, an M2M gateway, or an M2M server, it is apparent to those skilled in the art that the recipient CSE, the Registrar CSE, and the Registree CSE can be referred to as a recipient, a registrar, a registered M2M device, an M2M gateway, or an M2M server, respectively. And, since the middle node (MN) corresponds to an entity capable of existing at an M2M gateway only, it is apparent to those skilled in the art that the middle node can be referred to as an M2M gateway (a device or a server).

Figure 11:
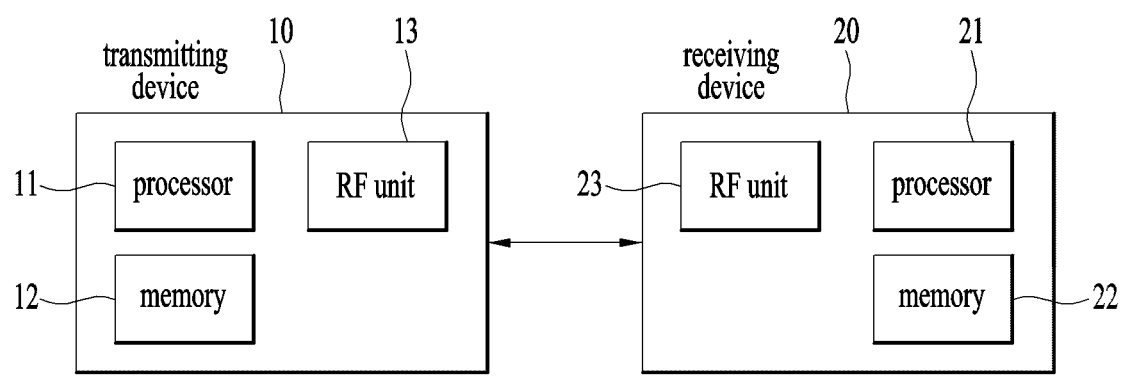
FIG. 11 is a block diagram for a device configured to implement embodiment(s) of the present invention.

FIG. 11 is a block diagram of a transmitting device 10 and a receiving device 20 configured to implement exemplary embodiments of the present invention. Referring to FIG. 11, the transmitting device 10 and the receiving device 20 respectively include radio frequency (RF) units 13 and 23 for transmitting and receiving radio signals carrying information, data, signals, and/or messages, memories 12 and 22 for storing information related to communication in a wireless communication system, and processors 11 and 21 connected operationally to the RF units 13 and 23 and the memories 12 and 22 and configured to control the memories 12 and 22 and/or the RF units 13 and 23 so as to perform at least one of the above-described embodiments of the present invention.

The memories 12 and 22 may store programs for processing and control of the processors 11 and 21 and may temporarily storing input/output information. The memories 12 and 22 may be used as buffers.

The processors 11 and 21 control the overall operation of various modules in the transmitting device 10 or the receiving device 20. The processors 11 and 21 may perform various control functions to implement the present invention. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present invention is implemented using firmware or software, firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

In the embodiments of the present invention, application (entity) or resource related entity etc. may operate as devices in which they are installed or mounted, that is, a transmitting device 10 or a receiving device 20.

The specific features of the application (entity) or the resource related entity etc. such as the transmitting device or the receiving device may be implemented as a combination of one or more embodiments of the present invention described above in connection with the drawings. For example, the specific features is described below in connection with FIG. 9.

In accordance with a embodiment of the present invention, provided is an M2M device configured to forward a message in a wireless communication system includes an RF (radio frequency unit) and a processor configured to control the RF unit.

The processor may be further configured to receive a request message, check whether or not the M2M device corresponds to the recipient of the request message using a specific parameter included in the request message.

If the M2M device is not the recipient of the request message, the processor may be configured to check whether or not there is only a registrar M2M device except an M2M device by which the request message is received within one hop of the M2M device. The registrar M2M device may correspond to an M2M device to which one or more different M2M devices are able to register.

If there is only the registrar M2M device within the one hop, the processor may be configured to forward the request message to the registrar M2M device. In this case, the specific parameter may correspond to a 'to' parameter.

Additionally or alternatively, if the M2M device is not the recipient of the request message, the processor may be further configured to check whether or not the recipient of the request message corresponds to a specific M2M device to which the M2M device registered or which registered to the M2M device.

If the recipient of the request message corresponds to the specific M2M device to which the M2M device registered or which registered to the M2M device, the processor may be further configured to forward the request message to the specific M2M device.

If there are a plurality of registrar M2M devices except the M2M device by which the request message is received within the one hop, the processor may be configured to transmit a message for querying information on a registrar M2M device to which the request message is forwarded to a device in which information for message forwarding is stored. The message for querying may include an identifier of the M2M device and an identifier of the recipient of the request message.

The processor may be configured to receive a response message including an identifier of the registrar M2M device to which the request message is forwarded in response to the message for querying and forward the request message to the registrar M2M device to which the request message is forwarded.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a terminal, a base station, a server, or other apparatuses.

What is claimed is:

1. A method of forwarding a message by a machine-to-machine (M2M) device in a wireless communication system, the method comprising:
   receiving, by the M2M device, a request message;
   determining, by the M2M device, whether the M2M device is a recipient of the request message based on a target address parameter included in the request message;
   based on the M2M device is not the recipient of the request message, determining, by the M2M device, whether there is only one registrar M2M device within one hop of the M2M device or there are a plurality of registrar M2M devices within the one hop,
   wherein the registrar M2M device denotes a device, different from the M2M device, to which a plurality of different M2M devices are registered;
   in case that there is only the registrar M2M device within the one hop, forwarding, by the M2M device, the request message only to the registrar M2M device;
   in case that there are the plurality of registrar M2M devices within the one hop, transmitting, by the M2M device to a routing function node, a query information message;
   in response to the query information message, receiving, by the M2M device from the routing function node, first information on a registrar M2M device among the plurality of registrar M2M devices; and
   forwarding, by the M2M device based on the first information, the request message to the registrar M2M device among the plurality of registrar M2M devices,
   wherein the first information is determined based on second information on every node, comprising the M2M device and the plurality of registrar M2M devices, registered in the wireless communication system, and
   wherein the second information is preconfigured in the routing function node.

2. The method of claim 1, in case that the M2M device is not the recipient of the request message, further comprising determining, by the M2M device, whether the recipient of the request message is a specific M2M device to which the M2M device registered or which registered to the M2M device.

3. The method of claim 2, in case that the recipient of the request message is the specific M2M device, further comprising forwarding, by the M2M device, the request message to the specific M2M device.

4. The method of claim 1, wherein the query information message comprises an identifier of the M2M device and an identifier of the recipient of the request message.

5. A machine-to-machine (M2M) device configured to forward a message in a wireless communication system, the M2M device comprising:
   a memory; and
   at least one processor coupled with the memory,
   wherein the at least one processor is configured to:
      receive a request message;
      determine whether the M2M device is a recipient of the request message based on a target address parameter included in the request message;
      based on the M2M device is not the recipient of the request message, determine whether there is only one registrar M2M device within one hop of the M2M device or there are a plurality of registrar M2M devices within the one hop,
      wherein the registrar M2M device denotes a device, different from the M2M device, to which a plurality of different M2M devices are registered;
      in case that there is only the registrar M2M device within the one hop, forward the request message only to the registrar M2M device;
      in case that there are the plurality of registrar M2M devices within the one hop, transmit, to a routing function node, a query information message;
      in response to the query information message, receive, from the routing function node, first information on a registrar M2M device among the plurality of registrar M2M devices; and
      forward, based on the first information, the request message to the registrar M2M device among the plurality of registrar M2M devices,
   wherein the first information is determined based on second information on every node, comprising the M2M device and the plurality of registrar M2M devices, registered in the wireless communication system, and
   wherein the second information is preconfigured in the routing function node.

6. The M2M device of claim 5, in case that the M2M device is not the recipient of the request message, the at least one processor is further configured to determine whether the recipient of the request message is a specific M2M device to which the M2M device registered or which registered to the M2M device.

7. The M2M device of claim 6, in case that the recipient of the request message is the specific M2M device, the at least one processor is further configured to forward the request message to the specific M2M device.

8. The M2M device of claim 5, wherein the query information message comprises an identifier of the M2M device and an identifier of the recipient of the request message.

* * * * *